July 25, 1950 E. MULLEN ET AL 2,516,407
VEHICLE SUPPORTING TREAD
Filed May 4, 1946
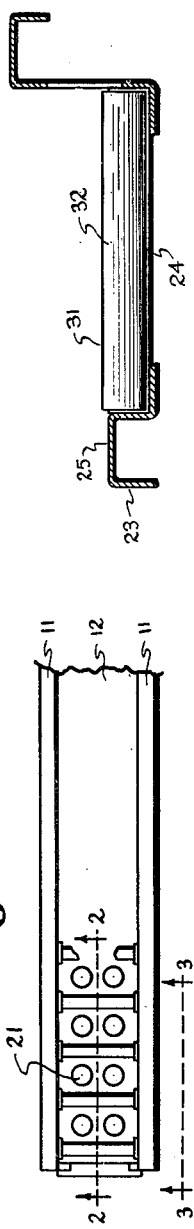
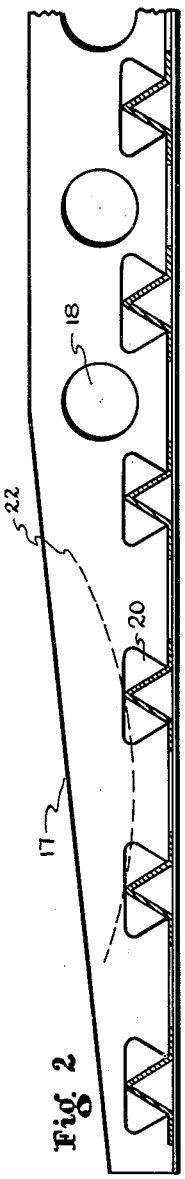
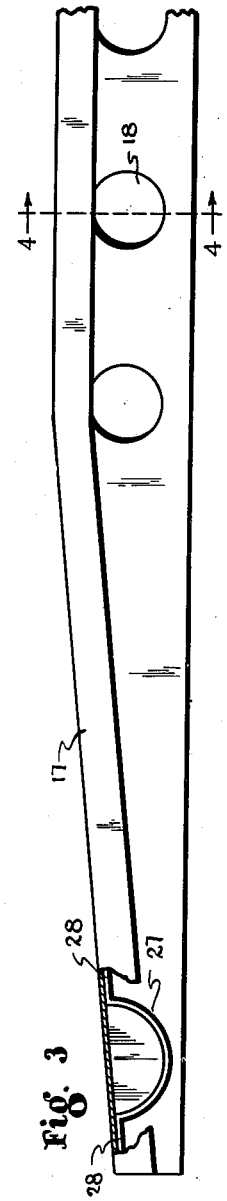
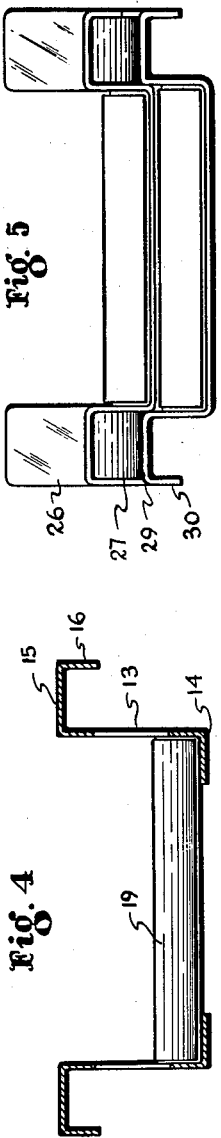
INVENTOR.
EDWARD MULLEN
BY JOHN BOYKO
Joseph Farley
ATTORNEY Patented July 25, 1950

2,516,407

UNITED STATES PATENT OFFICE 2,516,407

VEHICLE SUPPORTING TREAD

Edward Mullen and John Boyko, Detroit, Mich., assignors to Mechanical Handling Systems, Inc., Detroit, Mich., a corporation of Michigan Application May 4, 1946, Serial No. 667,347

6 Claims. (Cl. 193—41)

This invention relates to an improved construction for a vehicle supporting tread or ramp.

Devices of this type are often referred to as skids, and are widely employed as a means to load vehicles upon carriers such as railroad cars or automobile-carrying trailers, and can be employed in any situation where a pair of ramps are used to support a vehicle. With the majority of these uses of skids, portability of the skid is one of the main reasons for its use and therefore a construction which results in a light weight skid is one of the main objects of the present invention.

Another important object is to provide the best possible traction between the surface of the skid and the wheel of the vehicle resting thereon.

A further object is to provide a construction for a skid such that the skid will be self-clearing of water, snow, mud and the like, whereby the required traction will be assured at all times irrespective of weather conditions and which withal will furnish the required traction without damage to the vehicle tires.

Another object is to provide a loading skid that will have marked advantages from the standpoint of lightness of weight and as a result easy handling, yet will be stronger and more resistant to deformation under load than the much heavier skids heretofore employed.

Other objects include provisions for storing the skids when not in use, reducing the manufacturing cost, and other lesser objects and advantages which will be brought out in the detailed description of the invention which follows and in which reference is made to the accompanying drawings where:

Fig. 1 is a plan view of a skid section of the present invention;

Fig. 2 is a side view in cross section of the skid of Fig. 1 and taken along the line 2—2 of Fig. 1;

Fig. 3 is a side view of a portion of the skid of Fig. 1;

Fig. 4 is a cross sectional end view taken along the line 4—4 of Fig. 3;

Fig. 5 is an end view showing two skids in stored or nested relationship; and

Fig. 6 is a cross sectional view similar to that of Fig. 4 but showing an alternate form of construction.

This skid is in general comprised of three members, two side rails 11 connected to a center section or tread 12. As shown in Fig. 4, each side rail is formed with a main vertical section 13 terminating in a lower horizontal flange 14 extending inwardly from the vertical section 13 and an upper outwardly extending horizontal flange 15, which flange 15 in turn connects with a smaller, depending vertical section 16. While this cross sectional shape of the side rails 11 is not invariable, the section described has been found satisfactory to give sufficient strength to the structure, to give enough depth of side rail to keep vehicle wheels on the skid, and to permit easy storing of the skids as will be more fully explained later in this description.

Since these skids are largely used as a beam or bridge spanning two points, it is possible to form the side rails 11 with a tapered portion 17 at each of its ends, thus saving weight, and a further saving in weight is attained by providing lightening holes 18 all along the main vertical section 13 of each side rail 11 in between the tapered portions thereof.

The center section or tread 12 of the skid is made of a single piece of sheet metal. At spaced intervals along the tread the metal is formed into transverse ribs or cleats 19 extending between the main vertical portion 13 of the side rails 11 and joined to the portion 13 by lugs 20 which are bent at right angles to the inclined surfaces of the cleats 19 so as to lie parallel to the side rails 11. Spotwelds have been used to secure the lugs 20 to the side rails 11 and this means is also employed to fasten the tread 12 to the lower horizontal flange 14 of the side rails. In between the cleats 19 of the tread 12 are more lightening holes 21 which also perform the important function of providing an escape for any foreign matter such as mud, snow or ice deposited on the skid by vehicle tires and which would otherwise tend to pile up between the cleats 19 and destroy traction.

It is preferable in the designing of the cleats 19 to employ a height of cleat and a spacing between cleat such that the tires of vehicles supported by the skid will rest upon the cleats only and will not touch the surface of the tread between cleats. Such a condition is illustrated in Fig. 2 where the dotted line 22 is intended to represent the lower segment of the outer portion of the contour of a tire. Better traction is obtained with less injury to tires if this type of design is employed than is obtained when the tires are allowed to touch the main surface of the tread. Besides acting to furnish traction, the cleats 19, together with the manner in which they are joined to the side rails 11 through the lugs 20, give strength and rigidity to the tread and to the whole skid structure to such a degree that the tread 12 can be formed of very light gauge metal. Furthermore, the cleats themselves form the strongest portions of the tread and therefore if the skid is designed in the aforementioned manner so that the tires are supported on the tread by the cleats alone, the material of which the tread is fabricated may be further lightened.

As the skids of the present invention are primarily designed for use with the type of vehicles known as haulaway trailers, the skids are made in pairs. In order to facilitate their storage in transit on such trailers, the cross-sectional dimensions of one of a pair of skids is varied slightly so that it may be nested within the other skid of the pair for storage as shown by the skids 26 and 30 of Fig. 5. To further aid in storing the skids, and, as shown in Figs. 3 and 5, the inner skid 26 of the pair is provided with plates or shoes 27 which consist of semi-circular strips of metal having flanges 28 which are attached to the under surface of the upper horizontal flange 15 of the side rails. This shoe 27 extends below the level of the upper surface of the cleats 19 and, when a pair of skids are nested, rests upon the outer surface 29 of the upper horizontal flange of the side rail of the bottom skid 30 of the pair. Thus if one of these shoes 27 is provided near each corner of the skid 26, this skid can easily be slid along and within the skid 30 without interference between the ribbed treads of either skid.

An alternate type of skid construction, adapted to be used to support vehicles having dual wheels, is shown in Fig. 6. It is in all respects similar to the skid previously described except that in order that the outer tire of a dual wheel may overhang the outer edge of the skid, the outer side rail 23 thereof extends principally below the level of the tread 24. The upper flange 25 of this side rail 23 is preferably positioned below the level of the upper surface 31 of the cleats 32 so that there will be no interference with the traction between the skid and the inner tire of the dual wheel.

The simplicity of the skid construction of this invention is manifest. Furthermore, we have found that this skid is considerably lighter in weight than any known comparable skid and that the tread design gives better traction under all conditions with less damage to vehicle tires than do treads of ordinary corrugated or extruded metal.

We claim:

1. A pair of skids adapted to support a wheeled vehicle, each of said skids being comprised of longitudinal side members, a transverse member extending between said longitudinal members, and spaced cleats extending between said longitudinal members above the level of said transverse member, the first of said pair of skids being of different cross-sectional dimensions than the second skid of said pair whereby said skids may be stored in nested relationship, and means carried by one of said pair of skids to limit the extent of contacting surfaces between said pairs of skids when positioned in nested relationship, said means comprising a plurality of shoes secured to one of said pair of skids and adapted to contact the longitudinal members of the other of said pair of skids.

2. A pair of skids adapted to support a wheeled vehicle, each of said skids being comprised of longitudinal side members, a transverse member extending between said longitudinal members, and spaced cleats extending between said longitudinal members above the level of said transverse member, the first of said pair of skids being of different cross-sectional dimensions than the second skid of said pair whereby said skids may be stored in nested relationship and means carried by said skids whereby contact between the cleats of the outer skid and the transverse member of the inner skid will be prevented when said skids are positioned in nested relationship.

3. A skid for wheeled vehicles of the type wherein a pair of transversely spaced longitudinally extending Z-shaped sheet metal side rails are connected by a tread section extending between said side rails characterized by said tread section being formed by a plurality of longitudinally spaced inverted V-shaped cleats having horizontal portions extending laterally from the bottom thereof supported by the lower horizontal flanges of said side rails and being integrally united to said flanges and to the vertical side walls of said rails, and curved shoes secured to the under surface of the upper horizontal flange of said side rail and projecting downwardly below the upper edges of said V-shaped cleats whereby, when a skid is slid longitudinally with said shoes in engagement with the top flanges of the side rails of another skid, the cleats of one skid will be held out of contacting engagement with the cleats of the other skid.

4. A wheeled vehicle supporting skid of the type wherein a pair of transversely spaced longitudinally extending sheet metal side rails, each having a lower inwardly projecting and an upper outwardly projecting horizontally extending flange connected by a vertical side wall, are connected in transversely spaced relationship by a tread section, characterized by said tread section comprising a plurality of longitudinally spaced inverted V-shaped sheet metal cleats, the bottom edges of which adjacent to their side terminal portions rest upon and are welded to the horizontal flanges of said side rails thereby to prevent spreading of said cleats under load, the side edges of said cleats adjacent the tops thereof being welded to said side rails whereby said cleats and side rails mutually cooperate to reinforce each other against distortion under load, the height of said cleats and the longitudinal spacing thereof being such that the vertices at the upper edges of a plurality of adjacent cleats normally form the sole supporting and traction surface for tires of vehicles traversing said skid and the inner faces of said vertical walls of said side rails being entirely free of any projections above the plane in which the upper edges of said cleats lie that would contact or scrape the side walls of said tires.

5. A wheeled vehicle supporting skid of the type wherein a pair of transversely spaced longitudinally extending sheet metal side rails, each having a lower inwardly projecting and an upper outwardly projecting horizontally extending flange connected by a vertical side wall, are connected in transversely spaced relationship by a tread section, characterized by said tread section comprising a plurality of longitudinally spaced inverted V-shaped sheet metal cleats having an integral flange-like portion extending laterally from the bottom edges of the V legs thereof, the lower faces of which, adjacent to their side terminal portions, rest upon and are welded to the horizontal flanges of said side rails thereby to prevent spreading of said cleats under load, the side edges of said cleats adjacent the tops thereof being welded to said side rails whereby said cleats and side rails mutually cooperate to reinforce each other against distortion under load, the height of said cleats and the longitudinal spacing thereof being such that the vertices at the upper edges of a plurality of adjacent cleats normally form the sole supporting and traction surface for tires of vehicles traversing said skid and the inner faces of said vertical walls of said side rails being entirely free of any projections above the plane in which the upper edges of said cleats lie that would contact or scrape the side walls of said tires.

6. A wheeled vehicle supporting skid of the type wherein a pair of transversely spaced longitudinally extending sheet metal side rails, each having a lower inwardly projecting and an upper outwardly projecting horizontally extending flange connected by a vertical side wall, are connected in transversely spaced relationship by a tread section, characterized by said tread section comprising a plurality of longitudinally spaced inverted V-shaped sheet metal cleats having an integral flange-like portion extending laterally from the bottom edges of the V legs thereof, the bottom edges of which, adjacent to their side terminal portions, rest upon and are welded to the horizontal flanges of said side rails thereby to prevent spreading of said cleats under load, attachment lugs projecting laterally from the side edges of the legs of said cleats extending parallel to said vertical side walls and being welded thereto thereby to prevent buckling of said cleats under load, the side edges of said cleats adjacent the tops thereof being welded to said side rails whereby said cleats and side rails mutually cooperate to reinforce each other against distortion under load, the height of said cleats and the longitudinal spacing thereof being such that the vertices at the upper edges of a plurality of adjacent cleats normally form the sole supporting and traction surface for tires of vehicles traversing said skid and the inner faces of said vertical walls of said side rails being entirely free of any projections above the plane in which the upper edges of said cleats lie that would contact or scrape the side walls of said tires.

EDWARD MULLEN.
JOHN BOYKO.

REFERENCES CITED

The following references are of record in the file of this patent:

UNITED STATES PATENTS

| Number | Name | Date |
|---|---|---|
| 854,329 | Charron | May 21, 1907 |
| 1,194,819 | Clark | Aug. 15, 1916 |
| 1,898,679 | Millee | Feb. 21, 1933 |
| 2,266,543 | Francis | Dec. 16, 1941 |

FOREIGN PATENTS

| Number | Country | Date |
|---|---|---|
| 48,142 | Austria | May 26, 1911 |